US009429228B2

(12) United States Patent
Younger

(10) Patent No.: US 9,429,228 B2
(45) Date of Patent: Aug. 30, 2016

(54) METHODS FOR IMPROVING THE OPERATION OF TRANSMISSIONS FOR MOTOR VEHICLES

(71) Applicant: Silent Partner Grants, San Marino, CA (US)

(72) Inventor: Gilbert W. Younger

(73) Assignee: Silent Partner Grants, San Marino, CA (US)

( * ) Notice: Subject to any disclaimer, the term of this patent is extended or adjusted under 35 U.S.C. 154(b) by 609 days.

(21) Appl. No.: 13/986,976

(22) Filed: Jun. 20, 2013

(65) Prior Publication Data

US 2013/0340556 A1 Dec. 26, 2013

Related U.S. Application Data

(60) Provisional application No. 61/690,290, filed on Jun. 25, 2012.

(51) Int. Cl.
*B23P 6/00* (2006.01)
*F16H 61/00* (2006.01)
*F16H 61/14* (2006.01)

(52) U.S. Cl.
CPC ............ *F16H 61/0021* (2013.01); *B23P 6/00* (2013.01); *F16H 61/143* (2013.01); *F16H 2061/0062* (2013.01); *Y10T 29/4973* (2015.01); *Y10T 29/49302* (2015.01); *Y10T 29/49716* (2015.01); *Y10T 74/20024* (2015.01)

(58) Field of Classification Search
CPC ............ Y10T 29/49716; Y10T 29/4973; Y10T 29/49726; Y10T 29/49302; Y10T 29/49233; B23P 6/00; F16H 3/44; F16H 2061/0062
See application file for complete search history.

(56) References Cited

U.S. PATENT DOCUMENTS

| 4,449,426 A | 5/1984 | Younger |
| 4,711,140 A | 12/1987 | Younger |
| 4,790,938 A | 12/1988 | Younger |
| 5,253,549 A | 10/1993 | Younger |
| 5,540,628 A | 7/1996 | Younger |
| 5,624,342 A | 4/1997 | Younger |
| 5,730,685 A | 3/1998 | Younger |
| 5,743,823 A | 4/1998 | Younger |
| 5,768,953 A | 6/1998 | Younger |
| 5,820,507 A | 10/1998 | Younger |
| 5,967,928 A | 10/1999 | Younger |
| 6,099,429 A | 8/2000 | Younger |
| 6,117,047 A | 9/2000 | Younger |

(Continued)

*Primary Examiner* — Jermie Cozart
(74) *Attorney, Agent, or Firm* — Mark P. Stone

(57) ABSTRACT

A method in which the control lockup relay of a "factory installed" A750E, A750F, or A761E automotive transmission is removed from the original valve bore in which it is received, the width of the valve bore in enlarged, and the original control lockup relay is replaced by a wider control lockup relay accommodated in the enlarged valve bore for preventing cross-leaking between an hydraulic circuit applying pressure to the relay and an exhaust to maintain a predetermined applied pressure for normal operation of the relay. The control valve plunger of the lockup control valve of the "factory installed" transmission is replaced by a wider control valve plunger for preventing leaks between the hydraulic circuit applying hydraulic fluid pressure to the lockup control valve and an exhaust for maintaining the hydraulic pressure applied to the lockup control valve above a predetermined pressure for preventing erratic operation of the lockup control valve.

6 Claims, 2 Drawing Sheets

(56) References Cited

U.S. PATENT DOCUMENTS

| | | |
|---|---|---|
| 6,287,231 B1 | 9/2001 | Younger |
| 6,390,944 B1 | 5/2002 | Younger |
| 6,565,472 B1 | 5/2003 | Younger |
| 6,699,157 B2 | 3/2004 | Younger |
| 6,729,989 B2 | 5/2004 | Younger |
| 6,814,680 B2 | 11/2004 | Younger |
| 6,871,397 B2 | 3/2005 | Younger |
| 6,913,554 B2 | 7/2005 | Younger |
| 6,964,628 B2 | 11/2005 | Younger |
| 7,128,679 B2 | 10/2006 | Younger |
| 7,331,893 B2 | 2/2008 | Younger |
| 2003/0001127 A1* | 1/2003 | Stafford .............. F16H 61/0276 251/355 |
| 2012/0325331 A1* | 12/2012 | Mangiagli .............. G05D 16/10 137/12 |
| 2013/0037134 A1 | 2/2013 | Younger |

\* cited by examiner

US 9,429,228 B2

METHODS FOR IMPROVING THE OPERATION OF TRANSMISSIONS FOR MOTOR VEHICLES

The present patent application claims the benefit of U.S. Provisional Patent application Ser. No. 61/690,290 filed on Jun. 25, 2012, pursuant to 35 U.S.C. 119 (e).

BACKGROUND OF THE INVENTION

The methods and systems of the present invention are directed to the modification and improvement of transmissions for automotive vehicles, more commonly referred to as "factory installed" transmissions, installed in automotive vehicles by an original motor vehicle manufacturer. The invention is more particularly directed to improvements to "factory installed" transmissions for the Toyota and Lexus vehicles equipped with A750E, A750F, and A761E "Factory Installed Transmissions".

The present inventor is the inventor identified in the following United States patents and published patent application, the disclosures of which are expressly incorporated by reference into the present patent application: U.S. Pat. No. 4,449,426, issued May 26, 1984; U.S. Pat. No. 4,711,140, issued Dec. 8, 1987; U.S. Pat. No. 4,790,938, issued Dec. 13, 1988; U.S. Pat. No. 5,253,549; issued Oct. 19, 1993; U.S. Pat. No. 5,540,628, issued Jul. 30, 1996; U.S. Pat. No. 5,624,342; issued Apr. 29, 1997; U.S. Pat. No. 5,730,685, issued Mar. 24, 1998; U.S. Pat. No. 5,743,823, issued Apr. 28, 1998; U.S. Pat. No. 5,768,953, issued Jun. 23, 1998; U.S. Pat. No. 5,820,507, issued Oct. 7, 1998; U.S. Pat. No. 5,967,928, issued Oct. 19, 1999; U.S. Pat. No. 6,099,429, issued Aug. 8, 2000; U.S. Pat. No. 6,117,047, issued Sep. 12, 2000; U.S. Pat. No. 6,287,231, issued Sep. 11, 2001; U.S. Pat. No. 6,390,944, issued May 21, 2002; U.S. Pat. No. 6,565,472, issued May 20, 2003; U.S. Pat. No. 6,699,157, issued Mar. 2, 2004; U.S. Pat. No. 6,729,989, issued May 4, 2004; U.S. Pat. No. 6,814,680, issued Nov. 9, 2004; U.S. Pat. No. 6,871,397, issued Mar. 29, 2005; U.S. Pat. No. 6,913,554, issued Jul. 5, 2005; U.S. Pat. No. 6,964,628, issued Nov. 15, 2005; U.S. Pat. No. 7,128,679, issued Oct. 31, 2006; U.S. Pat. No. 7,331,893, issued Feb. 19, 2008; and US2013/0037134, published on Feb. 14, 2013.

It is the primary object of the present invention to modify the "factory installed" transmissions for the A750E, A750F and A761E transmission installed in Toyota and Lexus vehicles to improve the overall operation and efficiency of these "factory installed" automotive transmissions. The modifications to the "factory installed" transmissions, as more fully described herein, include modification of the torque converter charge circuit by enlarging the original inner valve bore to restore pressure in the converter apply circuit to avoid cross leaks with the exhaust circuit, and replacing the original lock up control valve plunger and bushing to avoid leaks in torque converter charge circuit.

Other objects and advantages of the modification to the "factory installed" automotive transmissions in accordance with the present invention will become apparent from the following description in conjunction with the drawings.

SUMMARY OF THE INVENTION

The primary object of the present invention is to protect the torque converter of a "factory installed" automotive transmission from damage resulting from cross leaks between the torque converter charge apply circuit and the exhaust circuit to prevent under pressurization of the torque converter apply circuit. Such cross leaks occur when the inner valve bore of a factory installed torque converter apply circuit is worn, resulting in leaking of fluid into the exhaust circuit, thereby reducing the pressure in the apply circuit causing torque converter apply malfunction such as slipping or shuddering.

In accordance with the present invention, the inner valve bore of the apply circuit of the factory installed transmission is enlarged, and a larger inner valve is installed to prevent leaking and maintain the proper apply pressure for normal operation of the torque converter function. The factory installed lock up control valve plunger and bushing is replaced to prevent leakage to the exhaust circuit to prevent erratic operation of the lock up control valve.

DESCRIPTION OF THE BEST MODES FOR CARRYING OUT THE INVENTION

Figure 1:
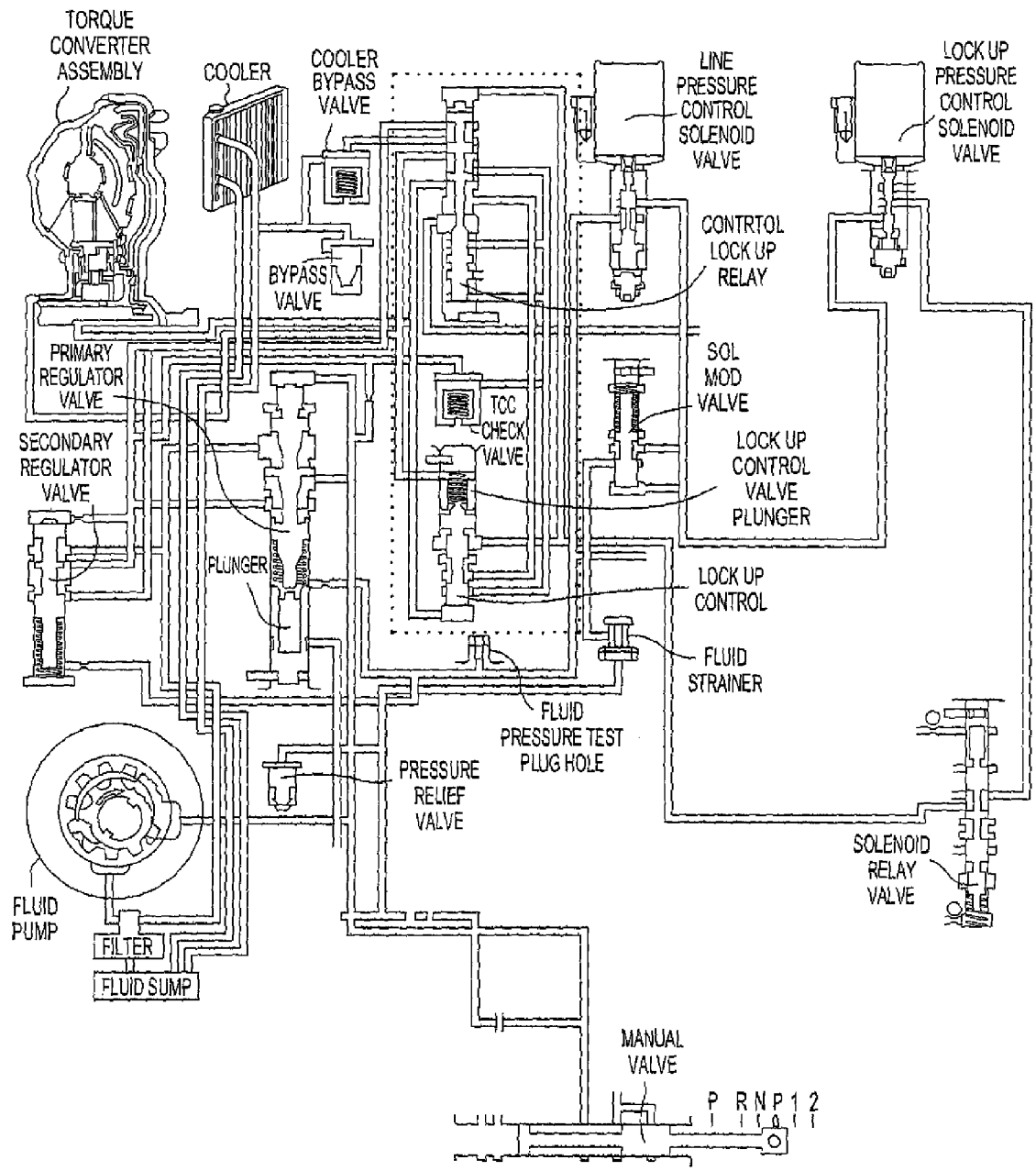
FIG. 1 of the drawing illustrates the hydraulic circuitry of a "factory installed" A750E, A750F and A761E automotive transmission for Toyota and Lexus motor vehicles.

FIG. 1 of drawing figure illustrates the overall hydraulic circuitry of a "factory installed" automotive transmission for a A750E, A750F, and A761E transmission installed in Toyota and Lexus vehicles. The overall hydraulic circuitry of these "factory installed" automotive transmissions is known to, and understood by, persons skilled in the relevant art.

Figure 2:
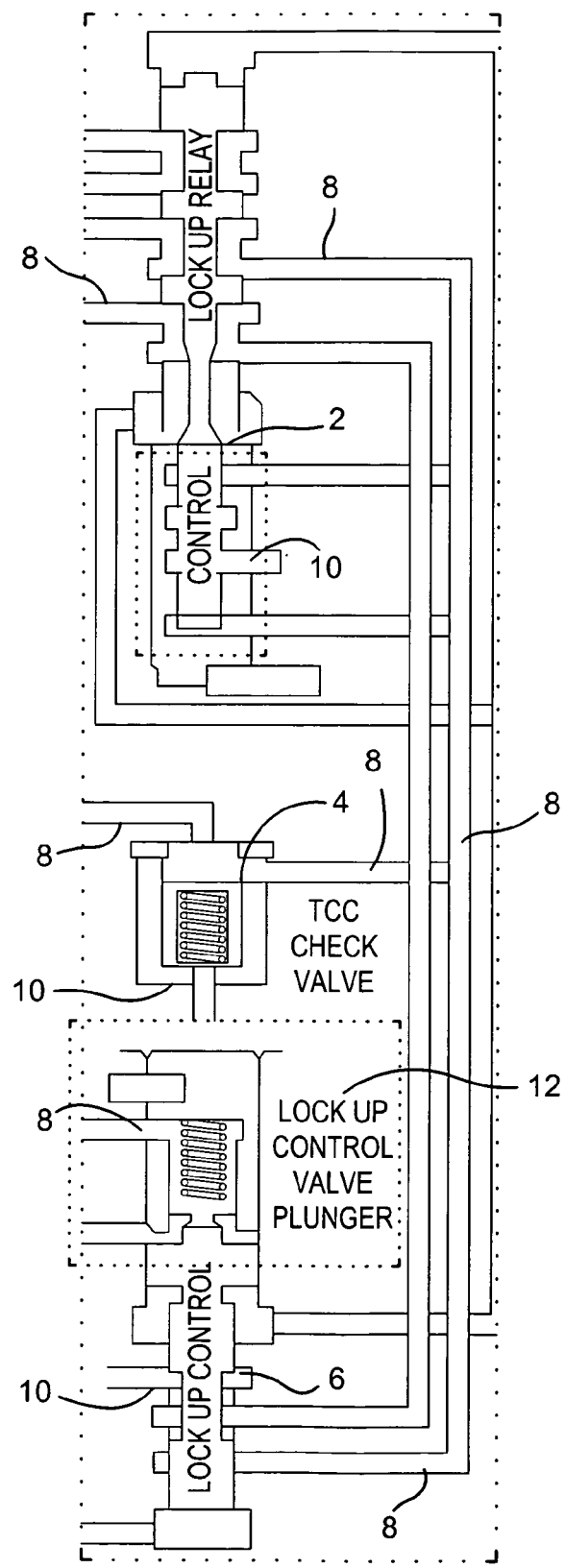
FIG. 2 illustrates isolated portions of the hydraulic circuitry, showing the improvements to the hydraulic circuitry in accordance with the present invention.

FIG. 2 of the drawing illustrates the isolated portions of the hydraulic circuitry shown in FIG. 1 which are most pertinent to the improvements provided by the present invention.

Referring to FIG. 2 of the drawing, the portion of the hydraulic circuitry control lockup relay is designated by reference numeral 2, the TCC (torque converter clutch) check valve is designated by reference numeral 4, and the lockup control valve is designated by reference numeral 6. A TCC (torque converter clutch) apply pressure circuit designated by reference numeral 8 applies converter pressure to the control lockup relay 2, the TCC check valve 4, and the lockup control valve 6. An exhaust circuit is provided for the control lockup relay, the TCC check valve, and the lockup control valve by exhaust ports designated by reference numeral 10.

During operation of the automotive transmission, wear on the inner bore of the control lockup relay causes cross leaking of hydraulic fluid from the hydraulic apply circuit 8 and the exhaust 10. The leakage results in pressure applied to the control lockup relay less than the hydraulic pressure required for normal operation of the control lockup relay during operation of the automotive transmission. This results in malfunction of the torque converter apply causing slippage, shuddering and mis-apply.

In accordance with one aspect of the method of the present invention, the inner valve bore containing the control lockup relay of the "factory installed" transmission is enlarged. The "factory installed" control lockup relay is then replaced by a wider relay conforming to the enlarged valve bore. The wider relay, in conjunction with the wider valve bore, prevents leaking of the TCC apply pressure from circuit 8 to the exhaust 10, thereby maintaining sufficient hydraulic pressure applied to the relay (i.e., preferably between 48 psi-99 psi) for proper functioning of the control lockup relay during normal operation of the automotive transmission.

The "factory installed" A750E, A750F, and A761E automotive transmissions have also been known to fail as a result of wear in the lockup control valve plunger, designated by reference numeral 12, in the lockup control valve 6. As the valve plunger 12 and an associated bushing become worn, TCC apply pressure from circuit 8 leaks into the exhaust 10. This results in a pressure lower than a predetermined minimum applied to the lockup control valve plunger, resulting in erratic apply pressure and erratic operation of the lockup control valve.

In accordance with a further aspect of the method of the present invention, the lockup control valve plunger 12 and associated bushing is replaced with a wider plunger to prevent leakage from the hydraulic circuit 8 applying hydraulic pressure to the lockup control valve through the exhaust 10 of the lockup control valve. As a result of the replacement of the "factory installed" control valve plunger with a wider plunger, leakage between the hydraulic circuit 8 applying hydraulic pressure to the lockup control valve 6 and the exhaust 10 is prevented, thereby maintaining hydraulic pressure applied to the lockup control valve at or above a predetermined pressure (i.e., preferably 91 psi) necessary for proper functioning of the lockup control valve during normal operation of the automotive transmission.

Other improvements and advantages within the scope of the present invention will be apparent to persons skilled in the relevant art. Accordingly, the description of the preferred embodiments of the invention made herein are intended to be illustrative only, and not restrictive of the scope of the invention, that scope being defined by the following claims and all equivalents thereto.

The invention claimed is:

1. A method for modifying the operation of an automotive transmission having a control lockup relay valve element reciprocatingly movable in a control lockup relay bore in response to means for applying hydraulic pressure, and an exhaust in said control lockup relay bore for exhausting hydraulic pressure from the control lockup relay bore, the steps of said method including:
    widening said control lockup relay bore, and
    replacing said control lockup relay valve element with a widened control lockup relay valve element conforming to said widened control lockup relay bore for preventing cross-leaks of hydraulic fluid from said means for applying hydraulic pressure and said exhaust in said control lockup relay bore for maintaining hydraulic pressure applied to said control lockup relay valve element above a predetermined pressure value during operation of said automotive transmission.

2. The method according to claim 1, wherein said automotive transmission includes a lockup control valve in fluid communication with said control lockup relay, said lockup control valve including a plunger for moving a lockup control valve element in reciprocating motion in a lockup control valve bore in response to said means for applying hydraulic pressure, and an exhaust in said lockup control valve bore for exhausting hydraulic pressure from said lockup control valve bore, the steps of said method further including:
    removing a bushing associated with the lockup control valve plunger and replacing said lockup control valve plunger and said bushing with a wider lockup control valve plunger, the outer surface of said wider lockup control valve plunger being substantially flush against the inner surface of said lockup control valve bore for preventing cross leaks of hydraulic fluid between said means for applying hydraulic pressure and said exhaust in said lockup control valve bore.

3. A method for modifying an automotive transmission including a lockup control valve plunger for moving a lockup control valve element reciprocatingly in a lockup control valve bore, means for applying a hydraulic pressure to said lockup control valve for moving said lockup control valve element and said lockup control valve plunger in said lockup control valve bore, and an exhaust for exhausting hydraulic pressure from said lockup control valve bore, the steps of said method including:
    removing a bushing associated with the lockup control valve plunger and replacing said lockup control valve plunger and said bushing with a wider lockup control valve plunger having an outer surface substantially abutting against the inner surface of the lockup control valve bore for preventing cross-leaks of hydraulic fluid between said means for applying hydraulic pressure and said exhaust in said lockup control valve bore.

4. A method for modifying the operation of a factory installed A750E, A750F, or A761E automotive transmission having a control lockup relay valve element reciprocatingly movable in a control lockup relay bore in response to means for applying hydraulic pressure, and an exhaust in said control lockup relay bore for exhausting hydraulic pressure from the control lockup relay bore, the steps of said method including:
    widening said control lockup relay bore of said factor installed automotive transmission, and
    replacing said control lockup relay valve element of said factory installed automotive transmission with a widened control lockup relay valve element conforming to said widened control lockup relay bore for preventing cross-leaks of hydraulic fluid from said means for applying hydraulic fluid and said exhaust in said control lockup relay bore for maintaining hydraulic pressure applied to said control lockup relay valve element above a predetermined pressure value during operation of said automotive transmission.

5. The method according to claim 4, wherein said factory installed A750E, A750F, or A761E automotive transmission includes a lockup control valve in fluid communication with said control lockup relay, said lockup control valve including a plunger for moving a lockup control valve element in reciprocating motion in a lockup control valve bore in response to said means for applying hydraulic pressure, and an exhaust in said lockup control valve bore for exhausting hydraulic pressure from said lockup control valve bore, the steps of said method further including:
    removing a bushing associated with the lockup control valve plunger and replacing said lockup control valve plunger and said bushing of said factory installed A750E, A750F or A761E automotive transmission with a wider lockup control valve plunger, the outer surface of said wider lockup control valve plunger being substantially flush against the inner surface of said lockup control valve bore for preventing cross leaks of hydraulic fluid between said means for applying hydraulic pressure and said exhaust in said lockup control valve bore.

6. A method for modifying the operation of a factory installed A750E, A750F or A761E automotive transmission including a lockup control valve plunger for moving a lockup control valve element reciprocatingly in a lockup control valve bore, means for applying a hydraulic pressure to said lockup control valve for moving said lockup control valve element and said lockup control valve plunger in said lockup control valve bore, and an exhaust for exhausting hydraulic pressure from said lockup control valve bore, the steps of said method including:

removing a bushing associated with the lockup control valve plunger and replacing said lockup control valve plunger and said bushing of said factory installed A750E, A750F or A761E automotive transmission with a wider lockup control valve plunger having an outer surface substantially abutting against the inner surface of the lockup control valve bore for preventing cross-leaks of hydraulic fluid between said means for applying hydraulic pressure and said exhaust in said lockup control valve bore.

\* \* \* \* \*